United States Patent
Smith (10) Patent No.: US 11,413,755 B2
(45) Date of Patent: Aug. 16, 2022

(54) COVERT IDENTIFICATION TAGS VIEWABLE BY ROBOTS AND ROBOTIC DEVICES

(71) Applicant: Sarcos Corp., Salt Lake City, UT (US)

(72) Inventor: Fraser M. Smith, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 509 days.

(21) Appl. No.: 15/859,618

(22) Filed: Dec. 31, 2017

(65) Prior Publication Data
US 2019/0202057 A1 Jul. 4, 2019

(51) Int. Cl.
*B25J 9/16* (2006.01)
*G06K 7/10* (2006.01)
(Continued)

(52) U.S. Cl.
CPC ........... *B25J 9/1669* (2013.01); *B25J 9/0003* (2013.01); *B25J 9/1674* (2013.01); *B25J 9/1697* (2013.01); *B25J 11/008* (2013.01); *B25J 19/02* (2013.01); *G05D 1/0234* (2013.01); *G06F 16/90335* (2019.01); *G06K 7/10722* (2013.01);
(Continued)

(58) Field of Classification Search
CPC ........ B25J 9/1669; B25J 19/02; B25J 9/0003; B25J 9/1674; B25J 11/008; B25J 9/1697; G05D 1/0234; G06K 19/06037; G06K 19/0614; G06K 19/06131; G06K 7/10722; G06K 7/12; G06K 7/10861; G06F 16/90335; Y10S 901/49; Y10S 901/01; Y10S 901/09; Y10S 901/47
See application file for complete search history.

(56) References Cited

U.S. PATENT DOCUMENTS

| 8,022,812 B2 | 9/2011 | Beniyama et al. |
| 9,821,548 B2 | 11/2017 | Rieck |

(Continued)

FOREIGN PATENT DOCUMENTS

| JP | S60-62907 A | 4/1985 |
| JP | S63-116286 A | 5/1988 |

(Continued)

OTHER PUBLICATIONS

International Search Report for International Application No. PCT/US2021/040578 dated Oct. 26, 2021, 17 pages.

*Primary Examiner* — Masud Ahmed (57) ABSTRACT

A system and method comprises marking or identifying an object to be perceptible to robot, while being invisible or substantially invisible to humans. Such marking can facilitate interaction and navigation by the robot, and can create a machine or robot navigable environment for the robot. The machine readable indicia can comprise symbols that can be perceived and interpreted by the robot. The robot can utilize a camera with an image sensor to see the indicia. In addition, the indicia can be invisible or substantially invisible to the unaided human eye so that such indicia does not create an unpleasant environment for humans, and remains aesthetically pleasing to humans. For example, the indicia can reflect UV light, while the image sensor of the robot can be capable of detecting such UV light. Thus, the indicia can be perceived by the robot, while not interfering with the aesthetics of the environment.

53 Claims, 5 Drawing Sheets

(51) Int. Cl.
  *B25J 9/00* (2006.01)
  *B25J 11/00* (2006.01)
  *G06F 16/903* (2019.01)
  *G05D 1/02* (2020.01)
  *G06K 19/06* (2006.01)
  *B25J 19/02* (2006.01)
  *G06K 7/12* (2006.01)

(52) U.S. Cl.
  CPC ........... *G06K 7/10861* (2013.01); *G06K 7/12* (2013.01); *G06K 19/0614* (2013.01); *G06K 19/06037* (2013.01); *G06K 19/06131* (2013.01); *Y10S 901/01* (2013.01); *Y10S 901/09* (2013.01); *Y10S 901/47* (2013.01); *Y10S 901/49* (2013.01)

(56) References Cited

U.S. PATENT DOCUMENTS

| | | | |
|---|---|---|---|
| 9,868,211 B2 | 1/2018 | Williams et al. | |
| 9,916,506 B1 | 3/2018 | Davis | |
| 10,209,080 B2 | 2/2019 | Lindhé et al. | |
| 2002/0158921 A1 | 10/2002 | Silverstein | |
| 2005/0269817 A1 | 12/2005 | Alasia et al. | |
| 2007/0135962 A1* | 6/2007 | Kawabe | G10L 13/00 700/225 |
| 2011/0196563 A1 | 8/2011 | Yturralde et al. | |
| 2012/0197439 A1* | 8/2012 | Wang | B25J 11/009 700/259 |
| 2013/0106833 A1* | 5/2013 | Fun | G06F 3/0325 345/419 |
| 2013/0325244 A1* | 12/2013 | Wang | G05D 1/0259 701/26 |
| 2014/0025443 A1* | 1/2014 | Onischuk | G07C 13/00 705/12 |
| 2014/0100693 A1* | 4/2014 | Fong | A47L 9/2873 700/253 |
| 2015/0220814 A1* | 8/2015 | Verkasalo | G06Q 30/0242 382/103 |
| 2015/0379459 A1* | 12/2015 | Russell | G06Q 10/0833 235/380 |
| 2016/0239952 A1* | 8/2016 | Tanaka | G01D 5/26 |
| 2017/0361466 A1 | 12/2017 | Anderson | |
| 2018/0215043 A1* | 8/2018 | Michalakis | B25J 11/008 |
| 2019/0080170 A1* | 3/2019 | Baca | G06K 9/00671 |
| 2019/0146518 A1* | 5/2019 | Deng | B25J 19/026 382/118 |
| 2019/0202057 A1 | 7/2019 | Smith | |
| 2019/0224852 A1* | 7/2019 | Choi | B25J 9/1679 |

FOREIGN PATENT DOCUMENTS

| | | | |
|---|---|---|---|
| JP | 2005-515479 A | | 5/2005 |
| JP | 2007-233533 A | | 9/2007 |
| JP | 2007-257226 A | | 10/2007 |
| JP | 2007-319989 A | | 12/2007 |
| JP | 2008264901 A | | 11/2008 |
| JP | 2009-023740 A | | 2/2009 |
| JP | 2012145559 A | * | 8/2012 |
| JP | 2013-025351 A | | 2/2013 |
| JP | 2015-225014 A | | 12/2015 |
| JP | 2016-201095 A | | 1/2016 |
| JP | 2017-113553 A | | 6/2017 |
| JP | 2017-527457 A | | 9/2017 |
| JP | 2017-501473 A | | 12/2017 |
| KR | 10-2017-0009103 A | | 1/2017 |
| WO | WO 9220748 A1 | | 11/1992 |
| WO | WO 2002023297 A1 | | 3/2002 |
| WO | WO 02088921 A2 | | 11/2002 |
| WO | WO 2015090397 A1 | | 6/2015 |
| WO | WO 2016122413 A1 | | 8/2016 |
| WO | WO 2017123761 A1 | | 7/2017 |
| WO | WO 2019/209878 A1 | | 10/2019 |

* cited by examiner

COVERT IDENTIFICATION TAGS VIEWABLE BY ROBOTS AND ROBOTIC DEVICES

BACKGROUND

Having a robot traverse a space and interact with objects can be a difficult task. The robot must be able to distinguish obstacles which could damage the robot, or which can be damaged by the robot. In addition, the robot must be able to identify objects with which it must interact in order to carry out instructions. Furthermore, some objects can present dangers or difficulties to interaction, such as the difference between a freezer and a fridge door, or which knob on a stove corresponds to which burner, etc.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

SUMMARY OF THE INVENTION

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a system and method for marking or identifying an object to be perceptible to a robot, or being machine-readable, while being invisible or substantially invisible to humans. Such marking can facilitate identification, interaction and navigation by the robot, and can create a machine or robot navigable environment for the robot. By way of example, such an object can be an appliance, such as a refrigerator, with which the robot approaches and interacts in order to complete a task, such as to retrieve an item (e.g., a beverage). Thus, the appliance or refrigerator can have a marking, label, tag or indicia that is machine-readable, and that can identify the appliance as a refrigerator, and thus the object with which the machine or robot will interact to retrieve the item. As used herein, the term "indicia" refers to one or more than one "indicium." In addition, the indicia can also identify the parts of the refrigerator, such as the handle, again with which the robot will interact. Multiple different markings, labels, tags or indicia can be used to distinguish the multiple different parts of the refrigerator, such as the refrigerator handle, the freezer handle, the ice maker dispenser, the water dispenser, different shelves or bins, etc. Furthermore, the indicia can also indicate a direction, magnitude or other parameters that may be useful to the robot in terms of how the robot should interact with the object. For example, the indicia can indicate which direction the door opens, how much force should be exerted to open the door, and the degree of rotation to be carried out.

The machine readable indicia can comprise symbols that can be perceived and interpreted by the robot, but that are not visible to the unaided human eye. In one example, the robot can utilize a camera with an image sensor to see the indicia. In addition, the indicia can be invisible or substantially invisible to the unaided human eye so that such indicia does not create an unpleasant environment for humans, and remains aesthetically pleasing to humans. For example, the indicia can reflect UV light, while the image sensor of the robot can be capable of detecting such UV light. Thus, the indicia can be perceived by the robot, while not interfering with the aesthetics of the environment.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "visible" refers to visible to the unaided human eye and visible with light in the visible spectrum, with a wavelength of approximately 400 to 750 nanometers.

As used herein, "indicia" refers to both indicia and indicium, unless specified otherwise.

Figure 1:
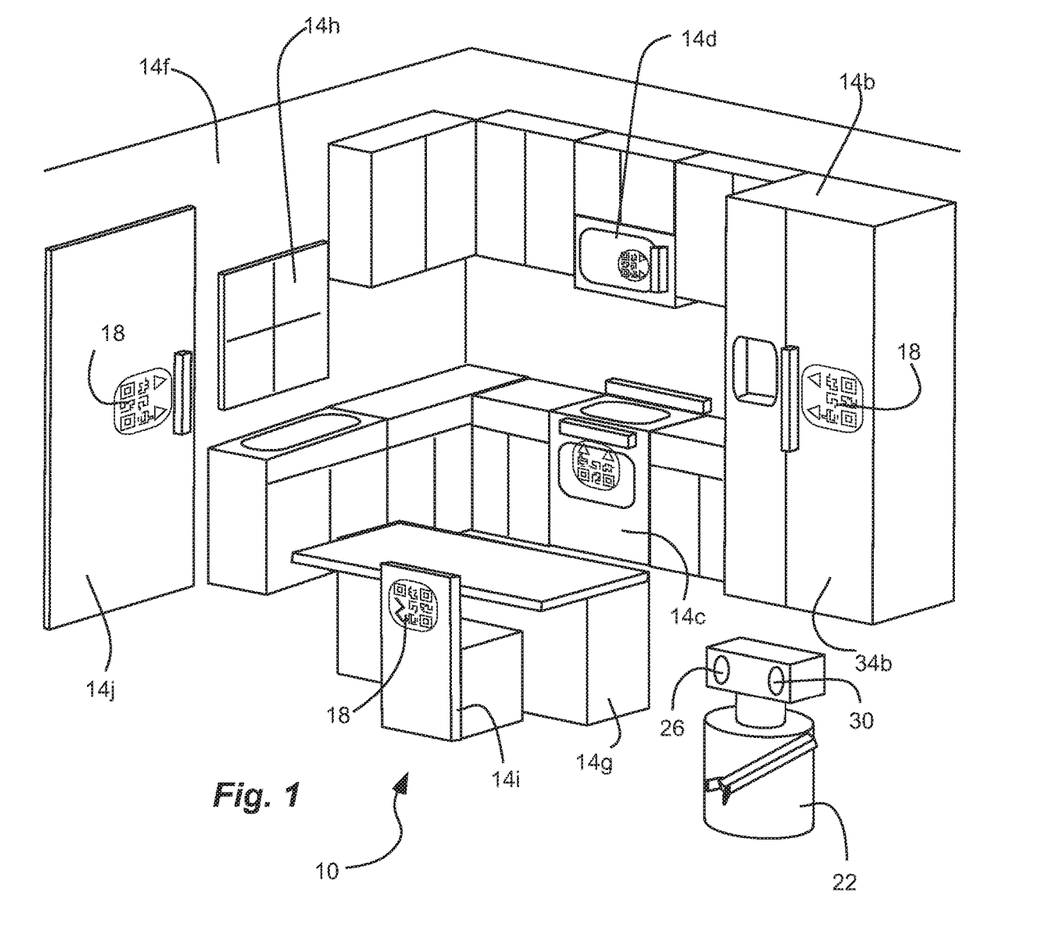
FIG. 1 is a schematic perspective view of a space with objects therein marked with machine-readable, but human-imperceptible, indicia, defining a machine-navigable environment through which a robot can navigate and interact, in accordance with an example.

FIG. 1 depicts a schematic perspective view of a space 10 with exemplary objects 14 marked with machine-readable, but human-imperceptible, indicia 18, therein, defining a machine-navigable environment through which a robot 22 can navigate and interact, in accordance with an example. The robot 22 can be mobile and self-propelled, such as with wheels and a motor, tele-operated, a humanoid robot, etc. as understood by those of skill in the art. The robot 22 can have one or more arms with grippers or fingers, or the like, for grasping or engaging objects. In addition, the robot 22 can have a camera 26 with an image sensor to view or sense objects and the environment. In one aspect, the camera 26 or image sensor can be operable in the UV spectrum, and can be capable or viewing or sensing UV light. In addition, the robot 22 can have a UV light source 30 capable of emitting UV light to illuminate and reflect off of the objects and environment. In one aspect, the UV light source 30 can emit, and the UV camera 26 or image sensor thereof can detect, near UV light (NUV) with a wavelength between 380 to 200 nanometers.

The objects 14 can vary depending upon the environment or space. In one aspect, the environment or space 10 can be a home or kitchen therein. Thus, the objects can comprise built-in appliances, such as a refrigerator 14b, a range 14c or stove and cooktop, a microwave oven 14d, a dishwasher, a trash compactor, etc. In another aspect, the objects can comprise countertop appliances, such as a blender, a rice-cooker, a vegetable steamer, a crackpot, a pressure cooker, etc. In addition, the objects can have an interface, such as a handle, knob, button, actuator, etc. In addition, the objects can be or can represent a physical boundary or barrier to movement or action of the robot, such as walls 14f, counters or islands 14g, etc. In addition, the objects can be or can represent a physical boundary or barrier subject to damage of the object by the robot, such as an outdoor window 14h, an oven window, a microwave window, a mirror, a glass door of a cabinet, etc. In addition, the object can be or can represent a physical boundary or barrier hazardous to the robot, such as stairs, etc. Furthermore, the object can be or can represent a physical boundary or barrier subject to frequent movement, such as a chair 14i, a door 14j, etc. The objects can have exterior, outfacing surfaces, represented by 34b of the refrigerator 14b, that face outwardly and into the space 10.

The indicia 18 can be disposed on and carried by the object 14, such as on the exterior, outfacing surface, etc. In one aspect, the indicia 18 can comprise information pertaining to the object, to the interaction of the robot with the object, the environment, etc. For example, the indicia can 18 can identify the object, a location of an interface of the object, indicate the physical boundary or barrier thereof, or can comprise certain interaction information directly thereon, or that comprises database-related or linking information that facilitates access to such interaction information, such as by providing a link, opening or causing to be opened, or other access initiating indicia to a computer database comprising the information, wherein the robot (or an operator) can interact with the computer database to obtain the information designed to assist the robot in how to interact with the object, its environment, etc. This is explained in further detail below.

The phrase "interaction information," as used herein, can mean information conveyed to the robot facilitated by reading of the marking indicia that can be needed by or useful to the robot to interact with an object in one or more ways, wherein the interaction information facilitates efficient, accurate and useful interaction with the object by the robot. More specifically, the interaction information can comprise information that pertains to a predetermined intended interaction of the robot with an object, and any other type of information readily apparent to those skilled in the art upon reading the present disclosure that could be useful in carrying out predetermined and intended robot interaction with the object in one or more ways. Interaction information can comprise, but is not limited to, information pertaining to the identification of the object (e.g., what the object is, the make or model of the object, etc.), information about the properties of the object (e.g., information about the material makeup, size, shape, configuration, orientation, weight, component parts, surface properties, material properties, etc. of the object), computer readable instructions regarding specific ways the robot can manipulate the object, or a component part or element of the object (e.g., task-based instructions or algorithms relating to the object and how it can be interacted with (e.g., if this task, then these instructions), information pertaining to how the robot can interact with the object (e.g., direction, magnitude, time duration, etc.), relative information as it pertains to the object (e.g., information about the object relative to its environment (e.g., distance from a wall, location where it is to be moved to, etc.) or one or more other objects, information about its location (e.g., coordinates based on GPS or other navigational information), etc.), information about tasks that utilize multiple marking indicia (e.g., sequence instructions that can include identification of the sequence, where to go to find the next sequential marking indicia, etc.). The nature, amount and detail of the interaction information can vary and can depend upon a variety of things, such as what the robot already knows, how the robot is operated, such as whether the robot is intended to function autonomously, semi-autonomously, or under complete or partial control via a computer program or human control, etc. The interaction information described and identified herein is not intended to be limiting in any way. Indeed, those skilled in the art will recognize other interaction information that can be made available to a robot or robotic device or a system in which a robot or robotic device is operated (e.g., such as to an operator, or to a system operating in or with a virtual environment) via the indicia. It is contemplated that such interaction information can be any that may be needed or desired for a robot, robotic device, etc. to interact with any given object, and as such, not all possible scenarios can be identified and discussed herein. In one aspect, the indicia can represent machine language that is recognizable and understood by the robot or computer processor thereof. In another aspect, the indicia can represent codes or numbers that can be compared to the look-up table or library. Thus, the look-up table or library can comprise codes or numbers associated with interaction information. In one aspect, the look-up table or library can be internal to the robot. In another aspect, the look-up table or library can be external to the robot, and with which the robot can communicate during operation (e.g., a computer network or cloud-based system accessible by the robot).

In another example, the environment or space can be an office. Thus, the objects can comprise walls, cubicles, desks, copiers, etc. In another example, the environment or space can be an industrial or manufacturing warehouse, plant, shipyard, etc. Moreover, the objects can comprise products, machinery, etc. Essentially, it is contemplated herein that the labels or indicia can be utilized in any conceivable environment in which a robot could operate, and that they can be utilized on any objects or items or structural elements within such environments, and that they can comprise any type of information of or pertaining to the environment, the objects, the interaction of these with one another, etc.

Figures 2A, 3:
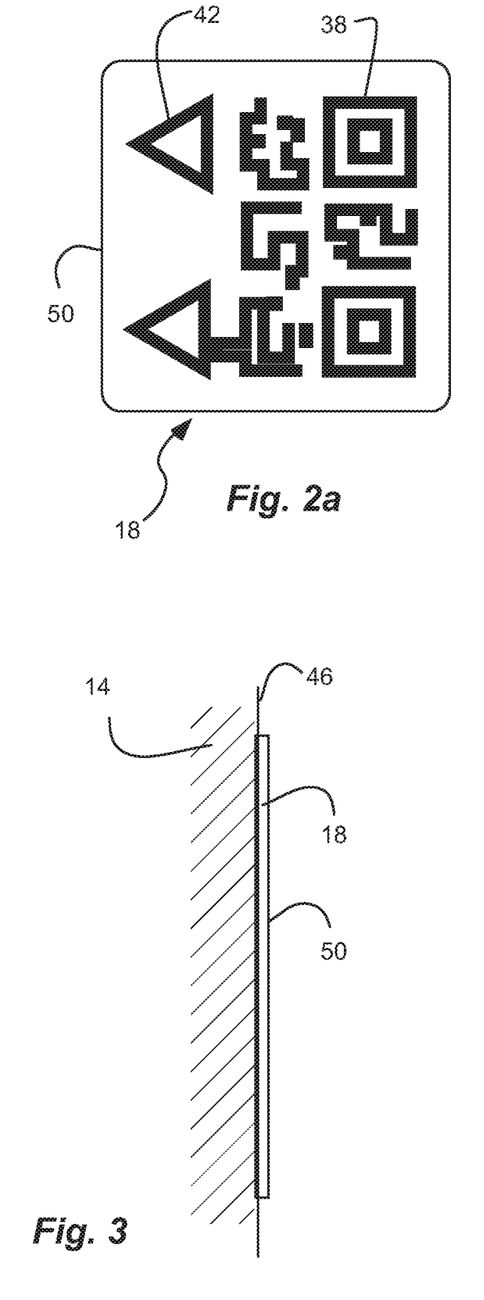
FIG. 2a is a schematic front view of a machine-readable, but human-imperceptible, label or indicia for marking an object of FIG. 1 in accordance with an example, and shown visible for the sake of clarity.
FIG. 3 is a schematic side view of the label or indicia for marking an object of FIG. 1 in accordance with an example.
Figures 2B, 4:
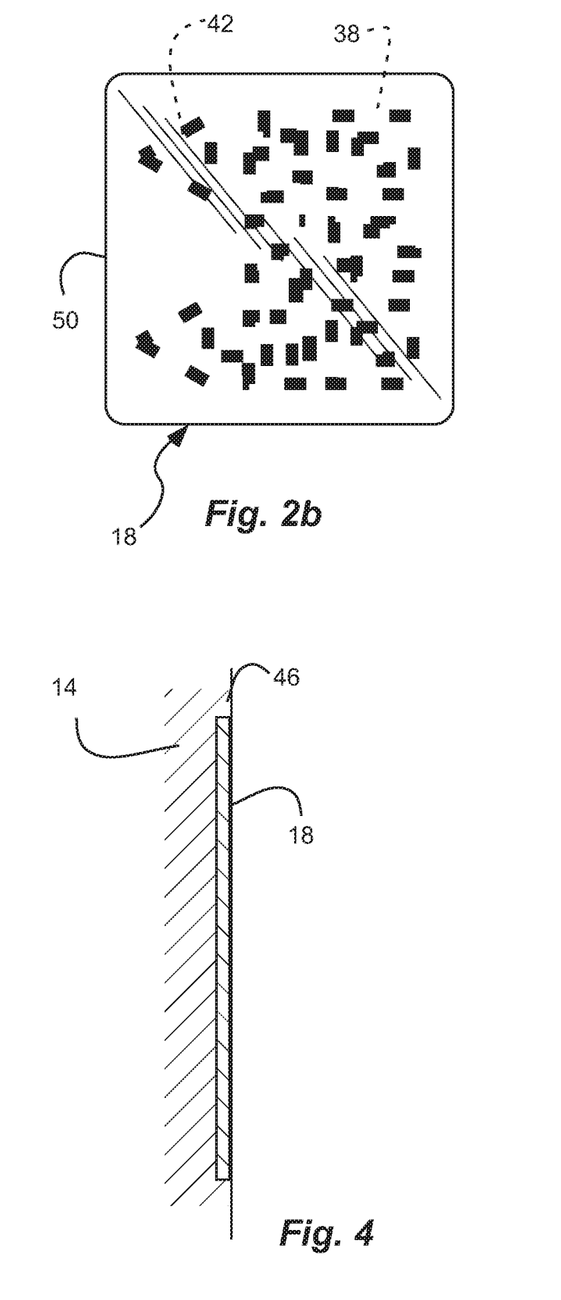
FIG. 2b is a schematic front view of the label or indicia for marking an object of FIG. 1 in accordance with an example, and illustrated in such a way to indicate invisibility.
FIG. 4 is a schematic cross-sectional side view of the label or indicia for marking an object of FIG. 1 in accordance with an example.

FIG. 2a depicts a schematic front view of a marker in the form of a label comprising indicia 18 configured to be applied to an object in accordance with an example. As such, the marker can comprise a physical medium or carrier operable to support or carry thereon the marking indicia. For sake of clarity, the label or indicia 18 is shown as being visible, although such indicia is configured to be invisible to the unaided human eye (human-imperceptible) and is substantially transparent to visible light. FIG. 2b depicts a schematic front view of the label and indicia 18 supported thereon, but illustrated in such a way to indicate invisibility to the unaided human eye, and substantial transparency to visible light. The indicia 18 is machine-readable. Thus, the indicia 18 can include symbols or patterns 38 or both that can be perceived by the camera 26 or image sensor (or other sensor or detector) thereof, and recognized by the robot 22. In one aspect, the indicia 18 can be or can comprise a bar code that is linear or one-dimensional with a series of parallel lines with a variable thickness or spacing to provide a unique code, or a two-dimensional MaxiCode or QR code with a pattern of rectangular or square dots to provide a unique code, etc. In another aspect, the indicia can include symbols, letters, and even arrows 42 or the like. In another aspect, the indicia 18 can be passive, as opposed to an active identifier, such as a radio frequency identification (RFID) device or tag.

In addition, the indicia 18 can be human-imperceptible or invisible or substantially invisible to the unaided human eye, as indicated in FIG. 2b. In one aspect, the indicia 18 can be invisible in the visible spectrum, and thus does not substantially reflect visible light. In one aspect, the indicia 18 can be transparent or translucent, so that visible light substantially passes therethrough. In one aspect, the indicia can be ultraviolet and can reflect ultraviolet light, either from the surrounding light sources, such as the sun, or as illuminated from the UV light source 30 of the robot 22. Thus, the indicia 18 can be visible in the UV spectrum. Therefore, the indicia 18 can be applied to an object and appear to the human eye as translucent or clear, or transparent to visible light, and thus can be substantially imperceptible to the unaided human eye to maintain the aesthetic appearance of the object. But the indicia 18 can be visible, such as in the UV spectrum, to the camera 16 of the robot 22.

The indicia can be visible outside of the visual spectrum. In one aspect, the indicia can fluoresce or be visible with infrared or IR (near, mid and/or far). For example, the object can be marked with indicia that is IR reflective and visible in the IR spectrum; and the robot can have a camera with an image sensor operable in the IR spectrum and an IR light source. In another aspect, the indicia can be radio frequencies or sound in wavelengths outside of the human audible ranges. For example, the object can be marked with indicia that is RF reflective; and the robot can have a sensor operable in the RF spectrum. As another example, the robot can touch the object with an ultrasonic emitter and receive a characteristic return signal, or emit a sound that causes an internal mechanism to resonate at a given frequency providing identification. Thus, the object can be marked with indicia that emits ultrasonic wavelengths, and the robot can have a sensor operable in the ultrasonic spectrum.

Referring again to FIG. 1, the object 14, such as a window of the range 14c, or a window of the microwave 14d, or the outside window 14h, can have a transparent portion. The indicia 18 can be disposed on the transparent portion, and can be transparent, as described above, so that the indicia does not interfere with the operation of the object or transparent portion thereof. Thus, the indicia 18 applied to the window 14h or transparent portion of the range 14c or microwave 14d does not impede viewing through the window or transparent portion.

FIG. 3 depicts a schematic cross-sectional side view of the label or indicia 18 for marking an object 14. In one aspect, the indicia 18 can be disposed over a finished surface 46 of the object 14. In one aspect, the indicia 18 can be or can comprise a removable label or a removable applique 50 removably disposed on or applied to an outermost finished surface 46 of the object 14. For example the indicia 18 can be printed on the label or the applique 50. The applique 50 can adhere to the finished surface 46 of the object, such as with a releasable or permanent adhesive. Thus, the indicia 18 can be applied to the objects 14 in an existing space, and after manufacture and transportation of the objects to the space. The indicia 18 or labels 50 can be applied to an existing space 10 and the objects therein.

FIG. 4 depicts a schematic cross-sectional side view of the label or indicia 18 for marking an object 14. In one aspect, the indicia 18 can be disposed under an outermost finished surface 46 of the object 14. For example, the indicia 18 can be disposed directly on the object, such as by printing or painting, and then the outermost finished surface 46, such as a clear coat or the like, can be applied over the indicia 18. Thus, the indicia 18 can be or can comprise a laminate with an outer layer 46 disposed over the indicia 18. In one aspect, the outer layer 46 can be transparent or translucent to visible light, such as a clear coat. In another aspect, the outer layer 46 can be opaque to visible light. In another aspect, the outer layer 46 can be transparent or translucent to UV light. Thus, the indicia 18 can be visible to the robot 22 or camera 26 or image sensor thereof, even when covered by the finished outer layer 46 of the object. Thus, the aesthetic appearance of the object can be maintained. In addition, the indicia 18 can be applied to the objects during manufacture and at the place of manufacture.

In another example, the indicia can be applied directly to the object without the use of a carrier medium (e.g., such as a label). In one example, the indicia can be applied by printing onto the object using a suitable ink. Many different types of inks are available, such as those that fluoresce at specific wavelengths.

In another aspect, the indicia can be applied or painted on during production of the object. In one aspect, the entire object can be painted with fluorescent paint or covering, and the indicia can be formed by a part that is unpainted or uncovered. In another aspect, the indicia or object can comprise paint that becomes capable fluorescence when another chemical is applied to the paint.

In another aspect, fluorescent markers can be used. For example, the fluorescent markers can include fluorescently doped silicas and sol-gels, hydrophilic polymers (hydrogels), hydrophobic organic polymers, semiconducting polymer dots, quantum dots, carbon dots, other carbonaceous nanomaterials, upconversion NPs, noble metal NPs (mainly gold and silver), various other nanomaterials, and dendrimers.

In another aspect, the indicia can be part of an attached piece. For example, the indicia can be on a handle or trim that is mechanically fastened or chemically adhered to the object. As another example, the indicia can be molded into a polymer of the handle, trim or other part.

Figure 5:
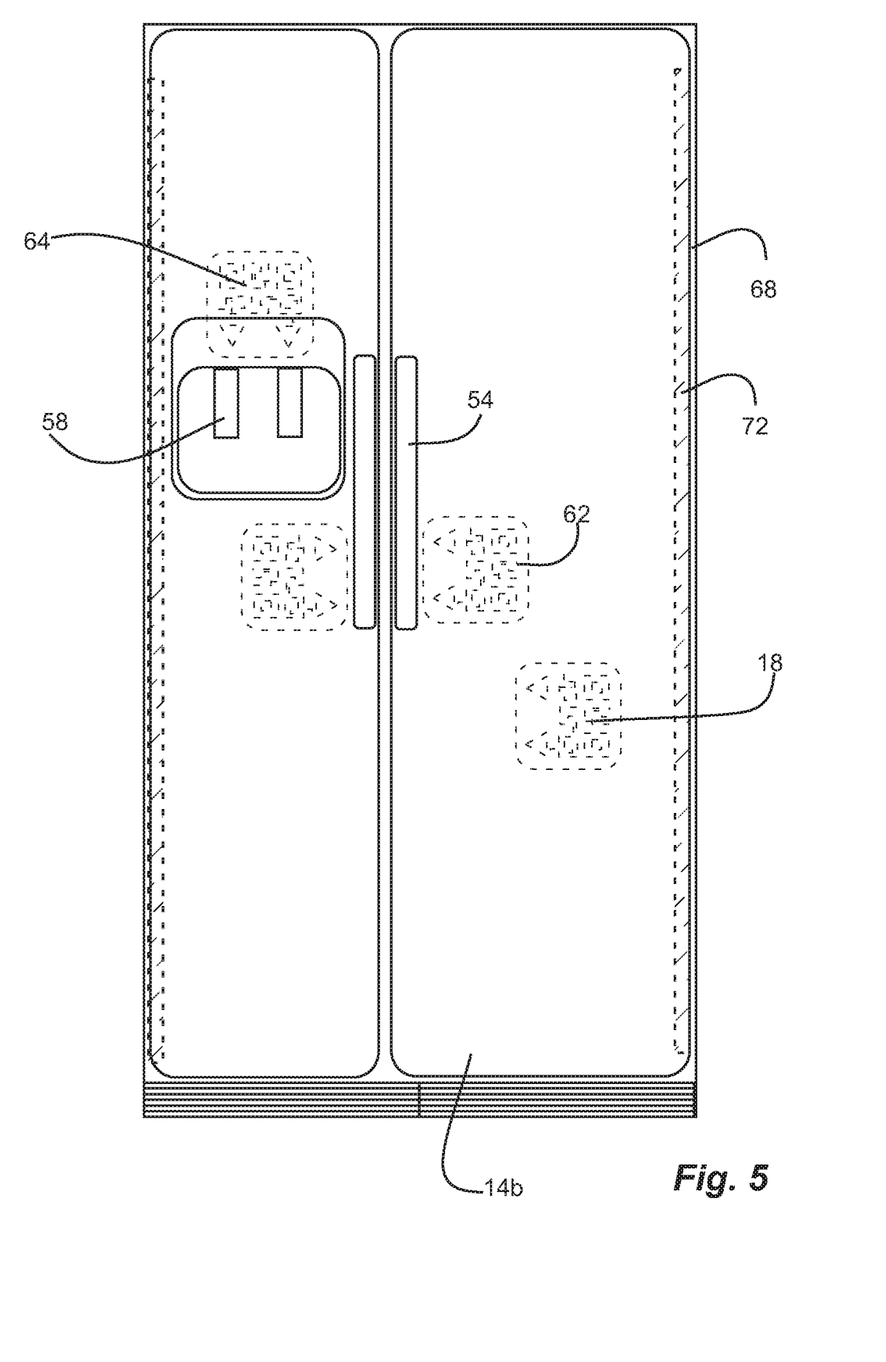
FIG. 5 is a schematic front view of an object of FIG. 1 in accordance with an example.

FIG. 5 depicts a schematic front view of an object, namely a refrigerator 14b, in accordance with an example. The object 14b can have an interface, such as one or more handles 54 or one or more buttons, knobs or actuators 58. In addition, the object 14b can have multiple labels or indicia 18. In one aspect, the indicia 18 can identify the object 14b as a refrigerator. In another aspect, other indicia 62 and 64 can identify a location of an interface, or the handle 54 or the actuator 58, respectively. Thus, the object 14b can have multiple different indicia 18, 62 and 64 on different parts of a single object, identifying the different parts 54 and 58 of the single object and information on how to interact with them. As described above, the indicia 18 can include an arrow 42 (FIGS. 2a and 2b) to indicate location of the interface. The indicia 62 and 64 can be disposed or located adjacent to the interface, or handle 54 and actuator 58, of the object so that the arrow 42 is proximal the interface. In addition, the indicia can include other information, or can facilitate access to other information (interaction information), such as a direction of operation (e.g. outwardly, inwardly, downward, to the right or to the left) of the interface or handle, or magnitude or limit of force required to operate the interface. For example, the indicia 62 in FIG. 5 can indicate, or facilitate access to information that indicates, that the object 14b is the refrigerator, identify the location of the handle 54, that a force of 10-20 lbs. is required to open the door, that the force applied should not exceed 30 lbs., that the door opens to the right or the maximum rotation of the door is not to exceed 120 degrees, or both. Such information can reduce the calculation time and computational power required by the robot to complete a task, and can reduce the need to learn certain aspects useful or required for interacting with the object(s).

The indicia 18, 62 and 64, can be located or disposed inside a perimeter 68 or lateral perimeter of the object 14c. In another aspect, the indicia 72 can be disposed at the perimeter 68 or lateral perimeter of the object 14c to help identify the boundaries of the object. The indicia 72 can substantially circumscribe the perimeter of the object.

Figure 6:
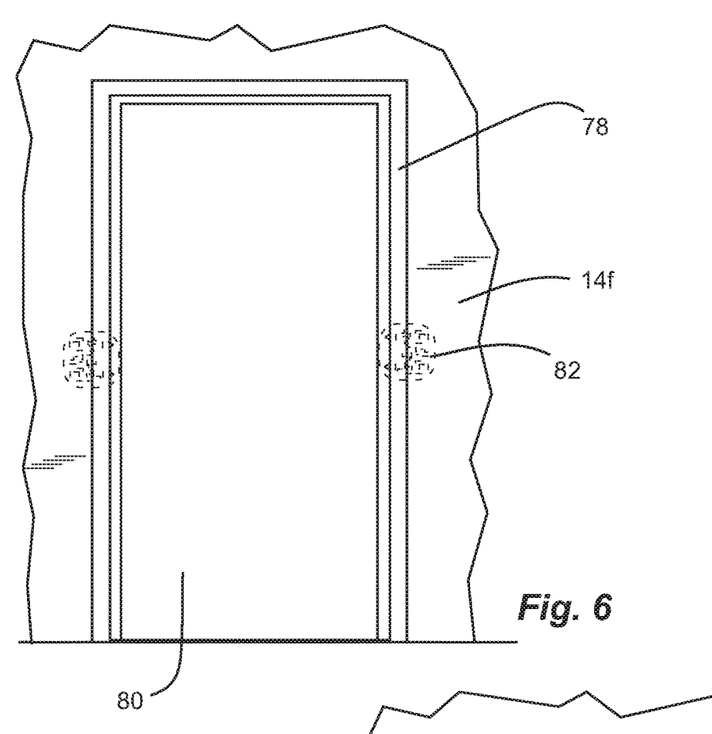
FIG. 6 is a schematic front view of an object of FIG. 1 in accordance with an example.

FIG. 6 depicts a schematic front view of an object, namely a doorway 78, with an interface, namely the opening 80 therethrough, in accordance with an example. The indicia 82 can be disposed on a wall 14f to identify the wall or the doorway 78, and to indicate the interface or opening 80 thereof and other pertinent information. The indicia 82 can be located adjacent to or proximal to the opening 80 at a perimeter thereof.

Figure 7:
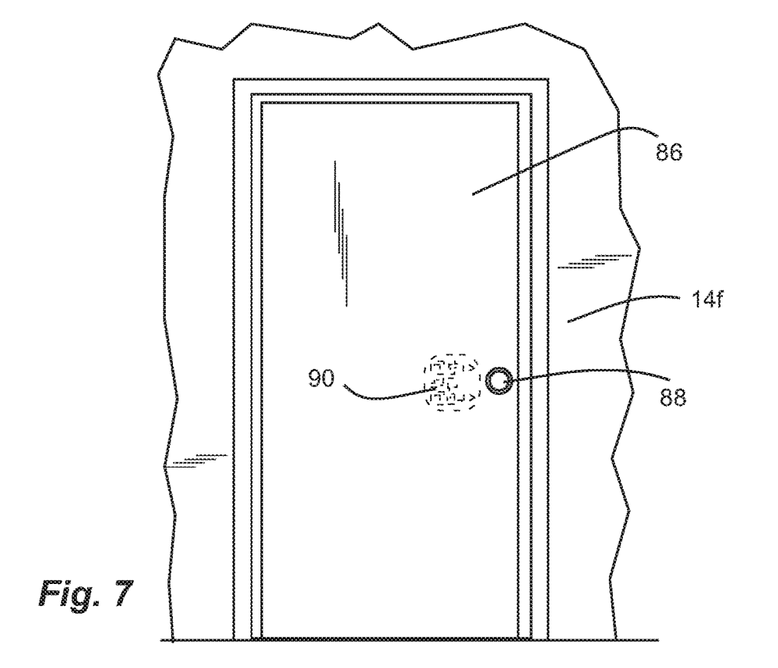
FIG. 7 is a schematic front view of an object of FIG. 1 in accordance with an example.

Similarly, FIG. 7 depicts a schematic front view of an object, namely a door 86, with an interface, namely a doorknob 88, in accordance with an example. The indicia 90 can be disposed on the door 86 to identify the door, and to indicate the interface or the doorknob 88 thereof and other pertinent information. To do so, the indicia 90 can be located adjacent to or proximal to the interface or the doorknob 90, respectively. Again, the indicia 90 can also indicate, or can facilitate access to information that can indicate, the direction of operation of the object or door (e.g. inwardly, outwardly, to the left, to the right), the direction of operation of the interface or doorknob (e.g. clockwise or counterclockwise), the force required to open the door or the doorknob, etc.

Figure 8:
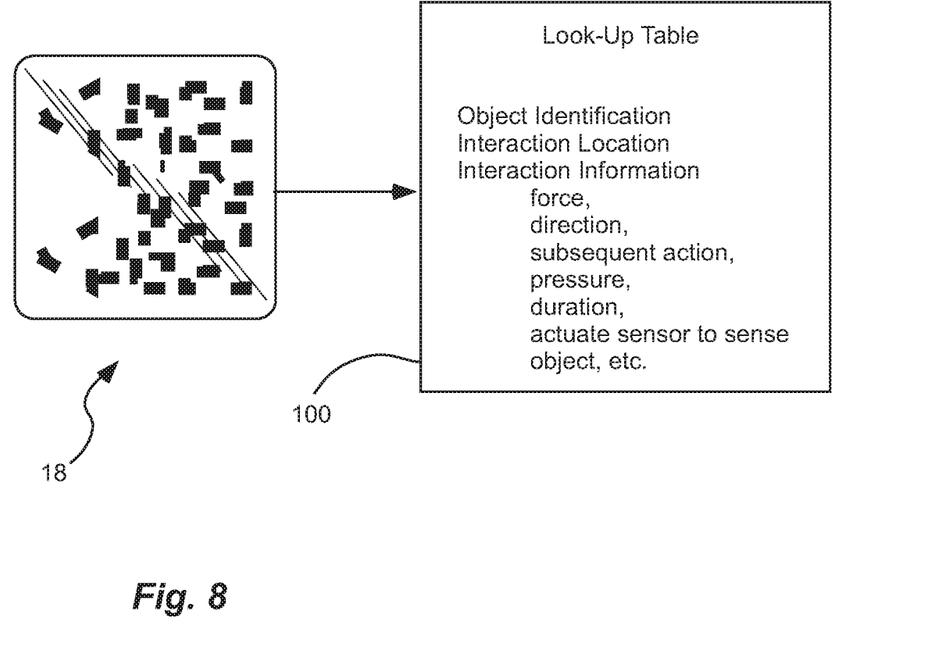
FIG. 8 is a schematic view of look-up table or library of indicia.

FIG. 8 depicts a schematic view of a look-up table 100 or library of information corresponding to the indicia 18, with the look-up table 100 or library of information stored in a computer database, accessible by the robot via one or more ways as is known in the art. As indicated above, the indicia 18 can identify or facilitate identification of the object, a location of an interface of the object, indicate or facilitate indication of the physical boundary or barrier thereof, and can comprise or facilitate access to information pertaining to robot interaction (or interaction information or instructions) with the object.

As indicated above, in one aspect, the indicia 18 can comprise multiple indicia 18 on a single object. In another aspect, the indicia 18 can comprise a series of indicia on a series of objects or a single object. Thus, the indicia 18 can comprise a series identifier to indicate its position in the series. The series of indicia can correspond to a series of objects, or aspects of one or more objects, with which the robot must interact in series or in sequence. For example, a first indicia can be associated with the refrigerator door, and can comprise indicia indicating that it is the first in a series of indicia, while a second indicia can be associated with a drawer in the refrigerator, and can comprise indicia indicating that it is the second in the series of indicia, while a third indicia can be associated with a container in the drawer, and can comprise indicia indicating that it is the third in the series of indicia. Thus, if the robot opens the refrigerator door, and looks through the drawer to the container, and thus sees the third indicia, the robot will know that there has been a skip in the sequence and know that it must search for the second indicia. Such a sequence in the indicia can help the robot perform the correct tasks, and can also provide safety to the objects and the robot.

In another aspect, the indicia can provide further instructions. For example, the indicia can represent instructions to instruct the robot to turn on a sensor that will be needed to interact with the object.

A method for creating a machine navigable environment for a robot 22, as described above, comprises identifying a desired space 10 in which the robot 22 will operate (e.g. a home or kitchen); selecting one or more objects 14 (e.g. a refrigerator 14d) that are or will be located in the space 10; marking the one or more objects 14 with indicia 18 being machine-readable and human-imperceptible; and introducing the robot 22 into the space 10. The robot 22 is capable of movement within the space 10, and the robot has a sensor 26 capable of perceiving the indicia 18 and processing the information contained therein that assist the robot in performing a task. Indeed, one or more desired or probable tasks to be given to the robot 22 can be identified, such as to obtain a beverage from the refrigerator 14b, etc. In addition, one or more objects 14b corresponding to the desired or probable task can be identified. Furthermore, instructions can be given to the robot 22 involving at least one of the one or more objects 14b.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for creating a machine navigable environment for a robot,
the method comprising:
identifying a desired space in which the robot will operate;
selecting one or more objects that are or will be located in the space; and
marking the one or more objects with indicia being machine-readable and human-imperceptible, each marking of indicia being associated with a task;
wherein the robot is capable of movement within the space, and wherein the robot has a sensor capable of perceiving the indicia, and
wherein each marking of indicia comprises a series identifier that indicates a position of each marking of indicia within a series corresponding to a sequence of tasks, including the task.

2. The method of claim 1, wherein the indicia comprise interaction information, including the series identifiers, that assists the robot with interaction with the object.

3. The method of claim 1, wherein the indicia facilitate access to interaction information stored in a computer database.

4. The method of claim 1, wherein marking the one or more objects with indicia further comprises marking the one or more objects with indicia that are UV reflective and visible in the UV spectrum, and the robot has a camera with an image sensor operable in the UV spectrum and a UV light source.

5. The method of claim 1, wherein marking the one or more objects further comprises applying the indicia on an external, outfacing surface of the object facing into the space.

6. The method of claim 1, wherein marking the one or more objects further comprises applying the indicia over a finished surface of the object.

7. The method of claim 1, wherein marking the one or more objects further comprises applying a removable applique with the indicia to an outermost finished surface of the object.

8. The method of claim 1, wherein marking the one or more objects further comprises disposing the indicia to be under an outermost finished surface of the object.

9. The method of claim 1, wherein the indicia are disposed in a laminate with an outer layer disposed over the indicia, and the outer layer is opaque to visible light.

10. The method of claim 1, wherein marking the one or more objects further comprises marking the one or more objects with indicia transparent to visible light.

11. The method of claim 1, wherein selecting the one or more objects further comprises selecting a transparent object, and wherein marking the one or more objects further comprises applying the indicia on the transparent object without interfering with the transparency of the object.

12. The method of claim 1, wherein the indicia identify the object.

13. The method of claim 1, wherein the indicia identify a location of an interface of the object.

14. The method of claim 1, wherein the indicia identify a location of an interface of the object and a direction of operation of the interface.

15. The method of claim 1, wherein marking the one or more objects further comprises marking an object inside a perimeter of the object.

16. The method of claim 1, wherein marking the one or more objects further comprises marking an object adjacent an interface of the object.

17. The method of claim 1, wherein marking the one or more objects further comprises marking an object substantially circumscribing a perimeter of the object.

18. The method of claim 1, wherein marking the one or more objects with indicia further comprises marking a single object of the one or more objects with multiple different indicia on different parts of the single object to identify the different parts of the single object.

19. The method of claim 1, wherein selecting the one or more objects further comprises selecting an object representing a physical boundary or barrier to movement or action of the robot; and wherein marking the one or more objects further comprises marking the object to indicate the physical boundary or barrier.

20. The method of claim 1, wherein selecting the one or more objects further comprises selecting an object representing a physical boundary or barrier subject to damage of the object by the robot, and wherein marking the one or more objects further comprises marking the object to indicate the physical boundary or barrier.

21. The method of claim 1, wherein selecting the one or more objects further comprises selecting an object representing a physical boundary or barrier subject to damage of the robot, and wherein marking the one or more objects further comprises marking the object to indicate the physical boundary or barrier.

22. The method of claim 1, wherein selecting the one or more objects further comprises selecting an object representing a physical boundary or barrier subject to frequent movement, and wherein marking the one or more objects further comprises marking the object to indicate the physical boundary or barrier.

23. The method of claim 1, further comprising:
identifying a desired or probable task to be given to the robot; and
identifying one or more objects corresponding to the desired or probable task.

24. The method of claim 1, further comprising:
giving an instruction to the robot involving at least one of the one or more objects.

25. The method of claim 1, wherein marking the one or more objects with indicia further comprises marking the one or more objects with indicia that are IR reflective and visible in the IR spectrum, and the robot has a camera with an image sensor operable in the IR spectrum and an IR light source.

26. The method of claim 1, wherein marking the one or more objects with indicia further comprises marking the one or more objects with indicia that are RF reflective, and the robot has a sensor operable in the RF spectrum.

27. The method of claim 1, wherein marking the one or more objects with indicia further comprises marking the one or more objects with indicia that emit ultrasonic wavelengths, and the robot has sensor operable in the ultrasonic spectrum.

28. An object configured for use with a robot with a sensor in a space defining a machine navigable environment, the object comprising:
a surface;
indicia disposed on the surface, the indicia being machine-readable by the sensor of the robot, and the indicia being human-imperceptible; and
the indicia identifying the object and comprising information pertaining to a task for interaction of the robot with the object and to a series identifier that indicates a position of the indicia in a series corresponding to a sequence of tasks, including the task.

29. The object of claim 28, wherein the indicia comprises interaction information indicating, at least in part, how the robot is to interact with the object.

30. The object of claim 28, wherein the indicia are visible in the UV spectrum; and wherein the robot has a camera with an image sensor operable in the UV spectrum and a UV light source.

31. The object of claim 28, wherein the indicia are disposed over a finished surface of the object.

32. The object of claim 28, wherein the indicia comprise an applique removably disposed on an outermost finished surface of the object.

33. The object of claim 28, wherein the indicia are disposed under an outermost finished surface of the object.

34. The object of claim 28, wherein the indicia comprise a laminate with an outer layer disposed over the indicia; and wherein the outer layer is opaque to visible light.

35. The object of claim 28, wherein the indicia are transparent to visible light.

36. The object of claim 28, further comprising a transparent portion; and wherein the indicia are disposed on the transparent portion without interfering with the transparency of the portion.

37. The object of claim 28, wherein the indicia identify a location of an interface of the object and a direction of operation of the interface.

38. The object of claim 28, wherein the indicia are disposed inside a perimeter of the object.

39. The object of claim 28, wherein the indicia are disposed adjacent an interface of the object.

40. The object of claim 28, wherein the indicia substantially circumscribe a perimeter of the object.

41. The object of claim 28, wherein the indicia further comprise multiple different indicia on different parts of a single object identifying the different parts of the single object.

42. The object of claim 28, wherein the object represents a physical boundary or barrier to movement or action of the robot; and wherein the indicia indicate the physical boundary or barrier.

43. The object of claim 28, wherein the object represents a physical boundary or barrier subject to damage of the object by the robot; and wherein the indicia indicate the physical boundary or barrier.

44. The object of claim 28, wherein the object represents a physical boundary or barrier subject to damage of the robot; and wherein the indicia indicate the physical boundary or barrier.

45. The object of claim 28, wherein the object represents a physical boundary or barrier subject to frequent movement; and wherein the indicia indicate the physical boundary or barrier.

46. The object of claim 28, wherein the indicia are visible in the IR spectrum, and the robot has a camera with an image sensor operable in the IR spectrum and an IR light source.

47. The object of claim 28, wherein the indicia are RF reflective, and the robot has a sensor operable in the RF spectrum.

48. The object of claim 28, wherein the indicia emit ultrasonic wavelengths, and the robot has sensor operable in the ultrasonic spectrum.

49. A machine readable marker, comprising:
human-imperceptible marking indicia,
wherein the machine readable marker is configured to be applied to an object, and wherein the human-imperceptible marking indicia comprises information pertaining to a task for robot interaction with the object and to a series identifier that indicates a position of the marking indicia within a series corresponding to a sequence of tasks, including the task.

50. The machine readable marker of claim 49, wherein the information comprises interaction information that assists the robot with interaction with the object.

51. The machine readable marker of claim 49, wherein the information comprises a link facilitating access interaction information stored in a computer database, the interaction information assisting the robot with interaction with the object.

52. A robotic system comprising:
human-imperceptible indicia associated with an object within an environment in which a robot operates, the human-imperceptible indicia comprising linking information pertaining to a task for a predetermined intended interaction of the robot with the object, and a series identifier that indicates a position of the indicia in a series corresponding to a sequence of tasks, including the task; and
a robot having at least one sensor operable to sense the human-imperceptible indicia and the linking information; and
wherein the linking information is operable to facilitate access to interaction information by the robot, the interaction information being operable to instruct the robot to interact with the object in accordance with the task.

53. A robotic system comprising:
human-imperceptible indicia associated with an object within an environment in which a robot operates, the human-imperceptible indicia comprising interaction information directly thereon pertaining a predetermined task of intended interaction of the robot with the object and a series identifier that indicates a position of the indicia in a series corresponding to a sequence of tasks, including the task; and
the robot having at least one sensor operable to sense the human-imperceptible indicia and the interaction information, the interaction information being operable to instruct the robot to interact with the object in accordance with the predetermined intended interaction.

* * * * *